US012724554B2

(12) United States Patent
Moran et al.

(10) Patent No.: US 12,724,554 B2
(45) Date of Patent: Sep. 1, 2026

(54) CONFIGURING ASYMMETRIC LOGICAL UNIT ACCESS STATES FOR PATHS

(71) Applicant: International Business Machines Corporation, Armonk, NY (US)

(72) Inventors: Timothy Andrew Moran, Southampton (GB); Mark Keith Elliott, Hampshire (GB); David Holman, Medstead (GB); Miles Mulholland, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/610,422

(22) Filed: Mar. 20, 2024

(65) Prior Publication Data

US 2025/0265004 A1 Aug. 21, 2025

(30) Foreign Application Priority Data

Feb. 20, 2024 (GB) ...................................... 2402395

(51) Int. Cl.
*G06F 3/06* (2006.01)

(52) U.S. Cl.
CPC .......... *G06F 3/0634* (2013.01); *G06F 3/0604* (2013.01); *G06F 3/067* (2013.01)

(58) Field of Classification Search
CPC ....... G06F 3/0634; G06F 3/067; G06F 3/0604
See application file for complete search history.

(56) References Cited

U.S. PATENT DOCUMENTS 9,886,195 B2 * 2/2018 Zhuang ................. G06F 3/0647
10,680,932 B1 6/2020 Colgrove et al.
11,283,716 B2 * 3/2022 Subbiah .............. H04L 67/1097
11,797,402 B1 10/2023 Sugihara et al.
11,803,453 B1 * 10/2023 Bunker ............... G06F 11/0751
2004/0123030 A1 * 6/2004 Dalal .................... G06F 3/0605
711/170

(Continued)

FOREIGN PATENT DOCUMENTS

CN 104991874 B 2/2018
GB 2638407 A 8/2025

OTHER PUBLICATIONS

Moran et al., "Configuring Asymmetric Logical Unit Access States for Paths", Application No. 2402395.4, filed Feb. 20, 2024.

(Continued)

*Primary Examiner* — Mark A Giardino, Jr.
(74) *Attorney, Agent, or Firm* — Scott Dobson

(57) ABSTRACT

A method, computer program product, and computer system are provided for configuring asymmetric logical unit access (ALUA) states for paths in a multipath storage system. The method includes providing storage feature indications for paths between a host and a volume, wherein the storage features are provided by the storage system end of the path. The method configures ALUA states for available paths between a host and a volume based at least partially on the storage feature indications to direct host operations to one or more paths based on available storage features at the storage system to prioritize paths with selected storage features. Configuring ALUA states for available paths may include configuring ALUA states for paths for a given host based on parameters of the host and storage feature of the path required for the host parameters.

18 Claims, 7 Drawing Sheets

(56) References Cited

U.S. PATENT DOCUMENTS

| | | | | |
|---|---|---|---|---|
| 2010/0124196 | A1* | 5/2010 | Bonar | H04B 7/0689 455/445 |
| 2017/0083417 | A1 | 3/2017 | Kawaguchi et al. | |
| 2021/0124515 | A1 | 4/2021 | Subbiah et al. | |
| 2021/0297363 | A1 | 9/2021 | Charles et al. | |
| 2022/0206871 | A1 | 6/2022 | Armangau et al. | |
| 2022/0398038 | A1* | 12/2022 | Anchi | G06F 3/0611 |
| 2023/0021806 | A1 | 1/2023 | Sakashita et al. | |
| 2024/0256125 | A1* | 8/2024 | Rao | G06F 3/0607 |
| 2024/0289038 | A1* | 8/2024 | Pabón | G06F 3/0635 |

OTHER PUBLICATIONS

Unknown, "ActiveCluster: Optimizing Host Performance with Array Preferences," https://support.purestorage.com/FlashArray/PurityFA/Replication/ActiveCluster/Fundamentals/ActiveCluster%3A_Optimizing_Host_Performance_with_Array_Preferences, Mar. 17, 2019, 4 pgs.

Intellectual Property Office, Patents Act 1977: Search Report under Section 17(5), Aug. 8, 2024, 3 Pages, GB Application No. 2402395.4.

* cited by examiner

STORAGE NETWORK 120

STORAGE CONTROLLER 130

FEATURE-BASED ALUA STATE CONFIGURATION COMPONENT 150

NODE 131

TARGET PORTS 133

NODE 132

TARGET PORTS 134

VOLUMES 135

SECOND STORAGE CONTROLLER 140

FEATURE-BASED ALUA STATE CONFIGURATION COMPONENT 150

NODE 141

TARGET PORTS 143

NODE 142

TARGET PORTS 144

VOLUMES 145

PHYSICAL STORAGE NETWORK 160

STORAGE DEVICE 161

STORAGE DEVICE 162

STORAGE DEVICE 163

CONFIGURING ASYMMETRIC LOGICAL UNIT ACCESS STATES FOR PATHS

BACKGROUND

The present disclosure relates to storage systems and, more specifically, to configuring asymmetric logical unit access (ALUA) states for paths between hosts and storage systems.

Asymmetric Logical Unit Access (ALUA) is a protocol for identifying optimized paths in a multipath environment between a host and a storage system. ALUA enables the initiator to query the target about path attributes and allows the target to communicate events back to the initiator. Multipathing software can be developed to support different storage arrays.

SUMMARY

According to an aspect of the present disclosure there is provided a computer-implemented method for configuring asymmetric logical unit access (ALUA) states for paths in a multipath storage system, said method comprising: providing storage feature indications for paths between a host and a volume, wherein the storage features are provided by the storage system end of the path; and configuring ALUA states for available paths between a host and a volume based at least partially on the storage feature indications to direct host operations to one or more paths based on available storage features at the storage system to prioritize paths with selected storage features.

This method has the advantage of promoting paths to target port groups at storage systems with identified storage features.

Configuring ALUA states for available paths may include configuring ALUA states for paths for a given host based on parameters of the host and storage feature of the path required for the host parameters.

This has the advantage of promoting paths to target port groups at storage systems that suit host requirements.

According to another aspect of the present disclosure there is provided a system for configuring ALUA states for paths in a multipath storage system, comprising: one or more processors and one or more memories configured to provide computer program instructions to the processor to execute the function of components including: a feature indication providing component for providing storage feature indications for paths between a host and a volume, wherein the storage features are provided by the storage system end of the path; and a state configuring component for configuring ALUA states for available paths between a host and a volume based at least partially on the storage feature indications to direct host operations to one or more paths based on available storage features at the storage system to prioritize paths with selected storage features.

According to a further aspect of the present disclosure there is provided A computer program product configuring ALUA states for paths in a multipath storage system, the computer program product comprising a computer readable storage medium having program instructions embodied therewith, the program instructions executable by a processor to cause the processor to: provide storage feature indications for paths between a host and a volume, wherein the storage features are provided by the storage system end of the path; and configure ALUA states for available paths between a host and a volume based at least partially on the storage feature indications to direct host operations to one or more paths based on available storage features at the storage system to prioritize paths with selected storage features.

The computer readable storage medium may be a non-transitory computer readable storage medium and the computer readable program code may be executable by a processing circuit.

BRIEF DESCRIPTION OF THE DRAWINGS

Embodiments of the present disclosure will now be described, by way of example only, with reference to the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

The ALUA protocol allows a storage controller to specify which paths are considered optimal between a storage system and a host by configuring ALUA states. A host multipath controller receives these details and, dependent on the implementation, gives preference to optimized paths. This has the effect that host IOs may be directed to specific nodes. This may be, for example, the node that owns a given volume, enabling access to it with minimal lock-messaging overheads.

A target port group is defined as a set of target ports that are in the same target port asymmetric access state at all times.

Using the ALUA state for a volume, a storage controller can inform the host of which paths are active and which ones are preferred. This uses the states of Active Optimized (AO) and Active Non-Optimized (ANO).

It is of note that some host configurations do not always obey the preferred paths indicated by the ALUA states. As a result, host commands are received on paths which are sub-optimal. In some circumstances, this can lead to negative consequences (e.g. additional space use).

In this disclosure, ALUA states are configured based on storage feature support of paths where there are multiple paths from a host to a volume of a storage system. ALUA states may be used to prioritize a path because a feature is present, regardless of what that feature is.

Figure 1:
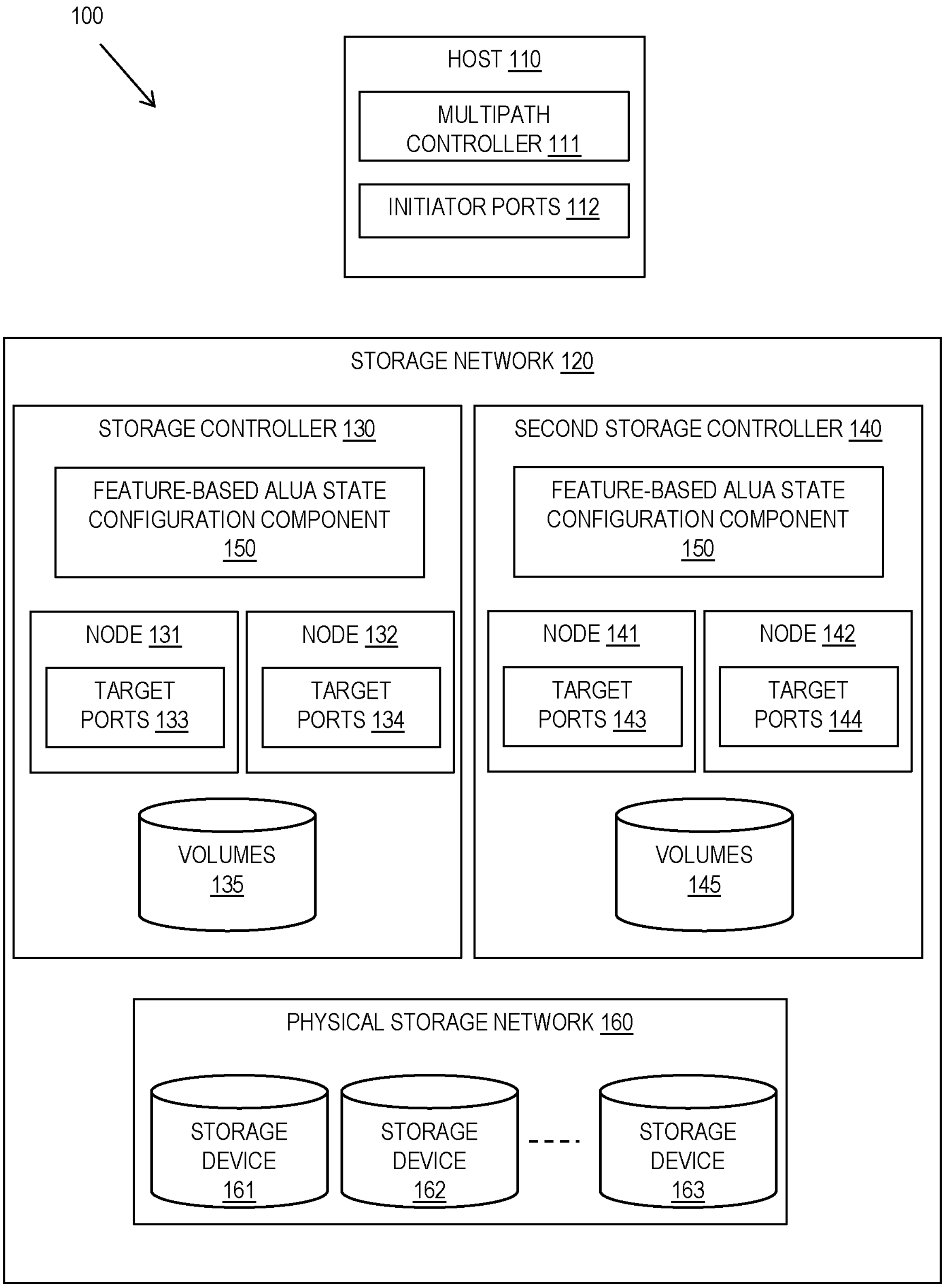
FIG. 1 is a block diagram of an example embodiment of a storage system in which embodiments of the present disclosure may be implemented.

Referring to FIG. 1, a block diagram shows an example embodiment of a storage system 100 in which the described method and system may be implemented. The example system includes one or more hosts 110 or clients that access a volume 135, 145 provided by storage controllers 130, 140 in a storage network 120. The volumes 135, 145 are logical drives that provide a single accessible storage area for underlying physical storage networks 160 formed of multiple physical storage devices 161-163.

There may be implementations with a single storage controller 130 with a cluster of nodes 131, 132 or implementations with multiple storage controllers 130, 140 each with clusters of nodes 131, 132, 141, 142. Multiple storage controllers 130, 140 are used for high availability configurations.

Paths are defined between a host 110 and a volume 135, 145 by the ports used. The host 110 has initiator ports 112 for a path to target ports 133, 134, 143, 144 of a volume 135, 145. A target port group is defined as a set of target ports that are in the same target port asymmetric access state at all times. The asymmetric access state of a target port group is the Small Computer System Interface (SCSI) mechanism used to report whether a particular group of target ports is Active/Optimized, Active/Non-Optimized, Standby, or Unavailable. Asymmetric Logical Unit Access (ALUA) states is an industry standard protocol for identifying optimized paths between a host and a volume of a storage system based on the asymmetric access states of the target port groups.

It is possible to have many technologies implementing the underlying volumes 135, 145. As examples, some volumes 135, 145 may be implemented using deduplication, some may be implemented using flash-core drives, some may be implemented using conventional flash drives or nearline storage. This provides an asymmetry to the volumes 135, 145.

The SCSI protocol allows storage devices to indicate the preferred target port groups for hosts 110 to use when they submit I/O requests to a volume 135, 145. Using the ALUA state for a path to a Logical Unit of a volume 135, 145, a storage controller 130, 140 can inform the host 110 of which paths are active and which ones are preferred. The host 110 has a multipath controller 111 to use the ALUA states for path selection.

ALUA states are conventionally set by comparison of the target port groups' priorities. Priority of the target port groups will be compared, and the target port group with the highest priority will be set as Active/Optimized (i.e. preferred paths); other target port groups may be set as Active/Non-optimized, Standby or Unavailable depending on this priority's comparison to thresholds for each ALUA state.

The described method and system provide a feature-based ALUA state configuration component 150 at the storage controller(s) 130, 140. The feature-based ALUA state configuration component 150 provides a method of configuring ALUA states based on storage features provided at the target end of the paths between the host 110 and volumes 135, 145. The storage features provided at the target end of the paths may be storage features provided by the node that owns the target ports that are part of the path or the storage features of the underlying physical storage used by the paths.

The storage features may be software features or hardware features of one or more of: volumes, storage controllers, nodes, and/or the underlying physical storage. The storage features may include capabilities and/or efficiency or performance. For example, a system may be capable of deduplication or not capable of deduplication and it may be preferential to route I/O to either system based on characteristics of the workload. In another example, the same capabilities may be available, but one system is running on more powerful hardware or is running at a more recently upgraded software level that has higher performance metrics; and it may be preferable to route hosts to these clusters if they are running more time-critical workloads.

The paths are routes between host initiator ports and storage controller target ports. The nodes of the storage controller present certain sets of target ports that have feature capabilities, with the paths as means to reach those nodes that have the capabilities. This is referred to as feature capabilities of the paths.

The feature-based ALUA state configuration component 150 may be used in combination with existing performance based ALUA state configuration or independently.

The method may be context sensitive or may be as simple as always prioritizing a new-feature-capable path, for example, in the case of upgrade.

The feature-based configuration state for storage paths is an improvement in the technical field of computer storage generally and more particularly in the technical field of prioritizing and controlling use of paths due to storage features available at the end of the paths.

Figure 2:
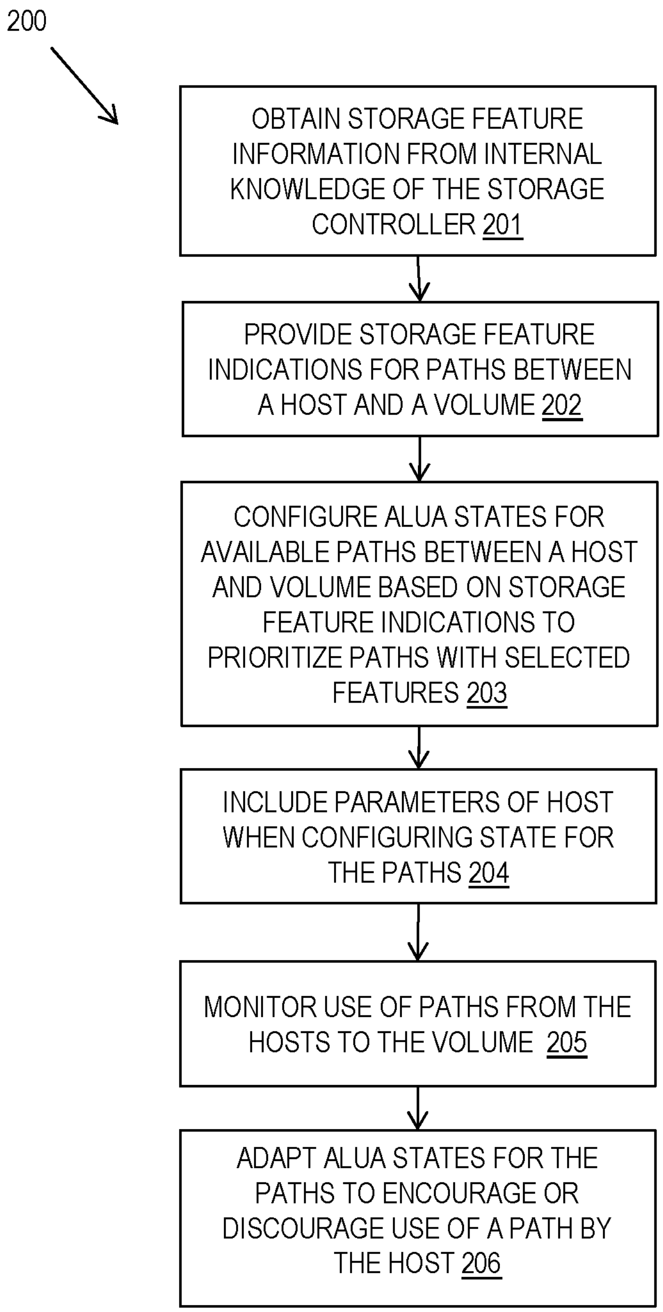
FIG. 2 is a flow diagram of an example embodiment of a method in accordance with the present disclosure.

FIG. 2 shows a flow diagram 200 of an example embodiment of the described method as carried out by a feature-based ALUA state configuration component 150 in a multipath storage system, where a path is defined by the target port group to which it is directed.

The method may obtain 201 storage feature information from internal knowledge of the storage system by a storage controller. The method may provide 202 storage feature indications for paths between a host and a volume, with the storage features being provided by the storage system end of the path. The storage features may include software features or hardware features of one or more of the group of: volumes, storage controllers, nodes, and physical storage.

The method may configure 203 ALUA states for available paths between a host and a volume based, at least partially, on the storage feature indications of the paths in order to direct host operations to one or more paths based on the available storage features at the storage system. The configuring step may include setting priorities of available paths between a host and a volume based on defined feature capabilities of the paths, with higher priority for paths with a certain feature capability and lower priority for paths without the certain feature capability. The configuring step may include setting initial priority for paths based on performance metrics and adjusting the initial priority based feature indication requirements.

Configuring ALUA states for paths for a given host may be based on 204 parameters of the host and the storage features of the path required for the host parameters. The host parameters may be how the host is configured and/or how the host is behaving.

This may configure the ALUA states for paths by taking into account the requirements of the host.

The method may monitor 205 the use of paths from a host to a volume including use of defined features. The monitoring may be used to detect cases where features are failing to be leveraged due to non-preferred path selection. The monitoring may be carried out through counting non-optimized path accesses, opportunistically detecting based on the host operating system, or through detecting based on the volume properties.

The method may adapt 206 an ALUA state for paths to encourage or discourage use of a path by a host in the event that current host accesses result in non-optimal use of a feature.

The configuring of ALUA states based on storage feature capabilities may include providing heterogenous feature support for dissimilar systems where a first storage feature is prioritized for a first host behavior and a second storage feature is prioritized for a second host behavior. This may alternatively prioritize paths with newly enabled storage features.

The method may include defining different storage controllers for a volume as running on different software levels having different storage features and configuring the ALUA states to prioritize certain sets of host commands to the storage controller with a software level that supports required features. For example, there may be a situation where both controllers have a feature turned on, but a particular version of that feature is known to be preferential. In another example, a feature may have been optimized between software releases and hosts should be routed to the more recent controller (or if regressed, then routed to the older controller). In a further example, a particular software level may be known to have difficulties with a particular host type that do not exist at another software level.

The configuring of ALUA states may also incorporate other performance-based prioritizations as well as being based on storage features.

Figure 3A:
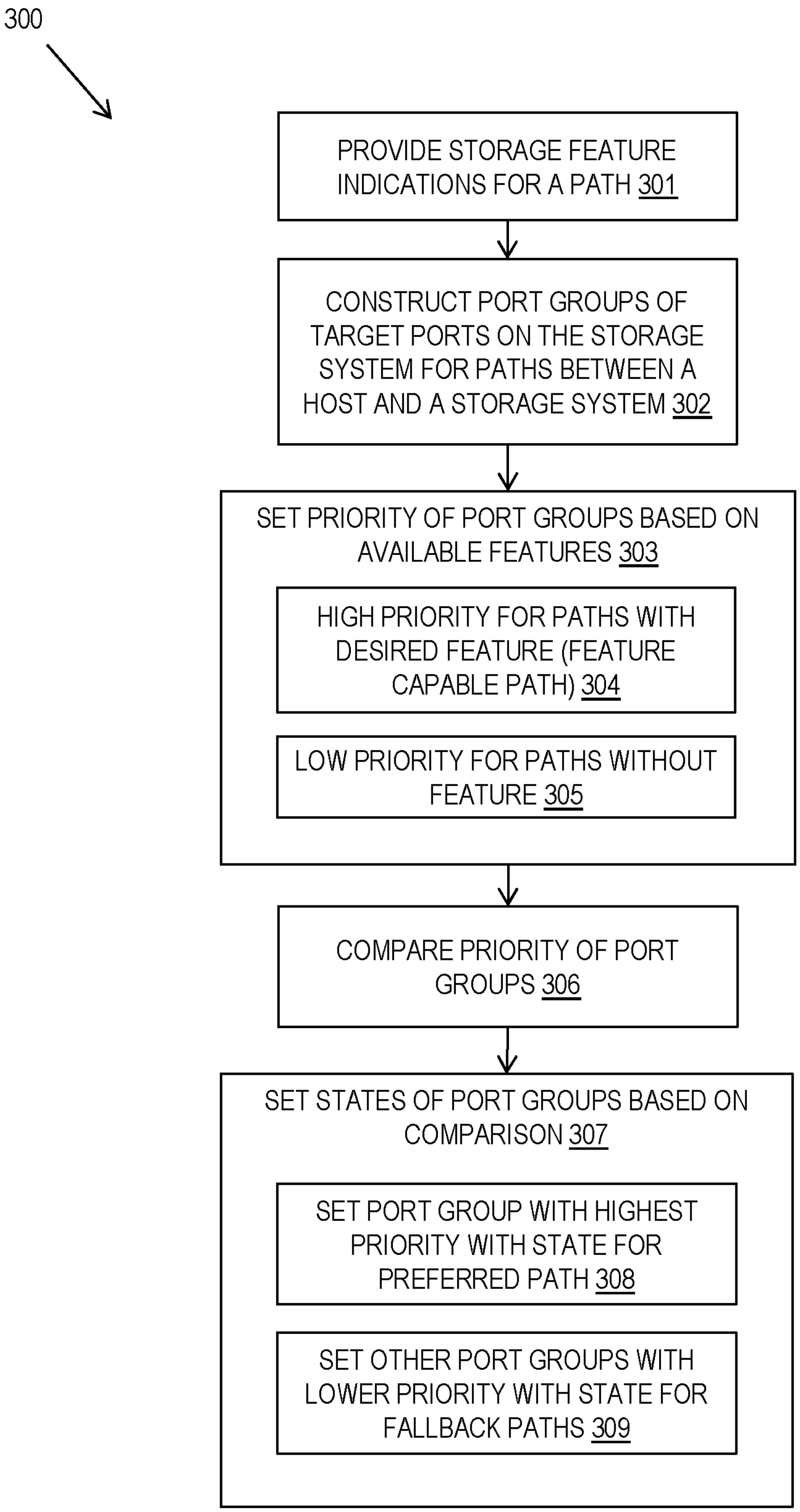
FIGS. 3A and 3B are flow diagrams of example embodiments of methods in accordance with embodiments of the present disclosure.
Figure 3B:
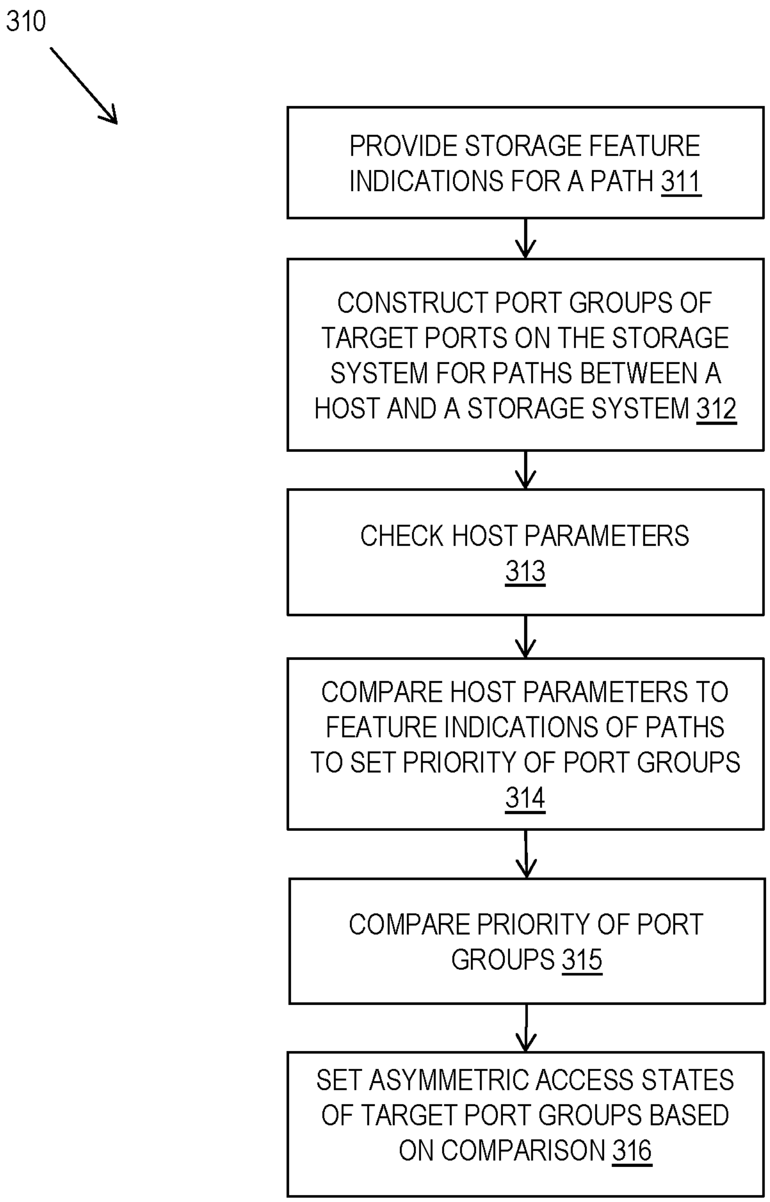

Referring to FIGS. 3A and 3B, flow diagrams 300, 310 show example embodiments of the described method with FIG. 3A showing a method that is not based on a particular host's requirements and FIG. 3B showing a method based on a host's requirements.

FIG. 3A shows a method 300 including configuration of ALUA states based on storage features that is not based on a particular host's requirements.

The method may provide 301 storage feature indications for paths between a host and a volume. The method may construct 302 target port groups using existing methods, i.e. a port group is constructed containing all the target ports for an individual node with this operation being performed for each node on each system. The port group has a state associated with it to represent the node and system that own its port.

The method may set 303 the priorities of target port groups based on available storage features of the target ports. A higher priority may be set 304 for paths with target ports with desired features, referred to as a feature capable path. A lower priority may be set 305 for paths with target ports without such desired features.

The method may compare 306 the priorities of port groups and may set ALUA states 307 of port groups based on the comparison. This may include setting 308 the port group with the highest priority with a state as a preferred path and setting 309 other port groups with lower priority as a fallback state. For example, the preferred path state may be Active-Optimized (AO) and the fallback state may be Active Non-Optimized (ANO).

Existing ALUA states include Active-Optimized (AO), Active non-Optimized (ANO), Transitioning, Standby, and Unavailable. Active-Optimized states provide the best IO to the LUN (Logical Unit Number) of a volume. Active Non-Optimized may operate with lower performance than they would if the target port were in the Active/Optimized state. Transitioning is for paths in the process of switching from one state to another. Standby is for paths that may not support all the commands that are supported while in the Active state. Unavailable is for paths where the access to the LUN is restricted.

Referring to FIG. 3B, a flow diagram shows a method 310 including configuration of ALUA states based on storage features and on a host's requirements for storage features.

As with the method of FIG. 3A, the method may provide 311 storage feature indications for paths between a host and a volume. The method may construct 312 target port groups using existing methods, i.e. a port group is constructed containing all the target ports for an individual node with this operation being performed for each node on each system. The port group has a state associated with it to represent the node and system that own its port.

In this embodiment, the method may check 313 the host parameters such as characteristics or requirements for defined features. The method may compare 314 the host parameters to feature indications of paths to target port groups to set the priority of the target port groups.

The method may compare 315 the priorities of port groups and may set the asymmetric access states 316 of target port groups based on the comparison. This may include setting 316 the port group with the highest priority with a state as a preferred path and setting other port groups with lower priority as a fallback state. For example, the preferred path state may be Active-Optimized (AO) and the fallback state may be Active non-Optimized (ANO).

As an example, when a report target port groups command is sent from a specific host to a specific volume for target port group information, the priority of these port groups may be calculated using a combination of existing metrics and the indicated path storage features. Each port group may be given an initial priority and this initial priority may then be adjusted based on some or all of the following considerations. The considerations may be weighted to give bias to required considerations.

The following are conventional considerations that may be used:

- A port group associated with the preferred node for the volume has increased priority of that port group.
- A port group associated with a node at a same site or location as the host has increase priority of that port group.
- A port group associated with a node that is expected to be taken offline has decreased priority of that port group.

The following are feature-based considerations that may be used:

- A port group associated with a system that is at a higher software level than the systems associated with other port groups has increased priority.
- A port group associated with a system that has a more capable or higher specification hardware than the systems associated with other port groups has increased priority.
- A port group associated with a system that has additional feature flags defined or enabled compared to systems associated with other port groups has increased priority.
- A port group associated with a system that has fewer objects defined than systems associated with other port groups (i.e. a system that is further from its configuration limits; which requires a utilization comparison but does not require a performance comparison) has increased priority.
- A port group associated with a system that has a feature flag enabled for a feature that is required or preferred by the host sending the command, or the volume receiving the command, when systems associated with other port groups do not have this feature flag enabled has increased priority. This checks host characteristics (such as host type) and compares it with feature characteristics of the volume (such as thin provisioning) based solely on the identities and associated configuration data for the volume and the host. No monitoring of I/O is required to implement this method.

ALUA states are set by comparison of the port groups' priorities. Priority of the port groups will be compared, and the port group with the highest priority will be set as Active/Optimized (i.e. preferred paths); other port groups may be set as Active/Non-Optimized, Standby or Unavailable depending on this priority comparison to thresholds for each ALUA state.

An example may have two storage controller nodes, Node A having fast Storage Class Memory (SCM) drives inside it and Node B having slower Near Line drives. The higher capability of the SCM hardware increases the priority metric for Node A relative to Node B. All else being equal, ports groups for ports on Node A would be set as Active/Optimized (preferred paths) more frequently than port groups for ports on Node B. Additionally, a flag may indicate whether individual hosts require or prefer this additional performance (or other features that differ between the two nodes). These host requirements may then be accounted for in the priority metrics. Hosts that require the performance of Node A will more frequently see Node A's port groups as Active/Optimized, while other hosts that do not require the performance will see port groups on Node B more frequently as Active/Optimized.

Figure 4:
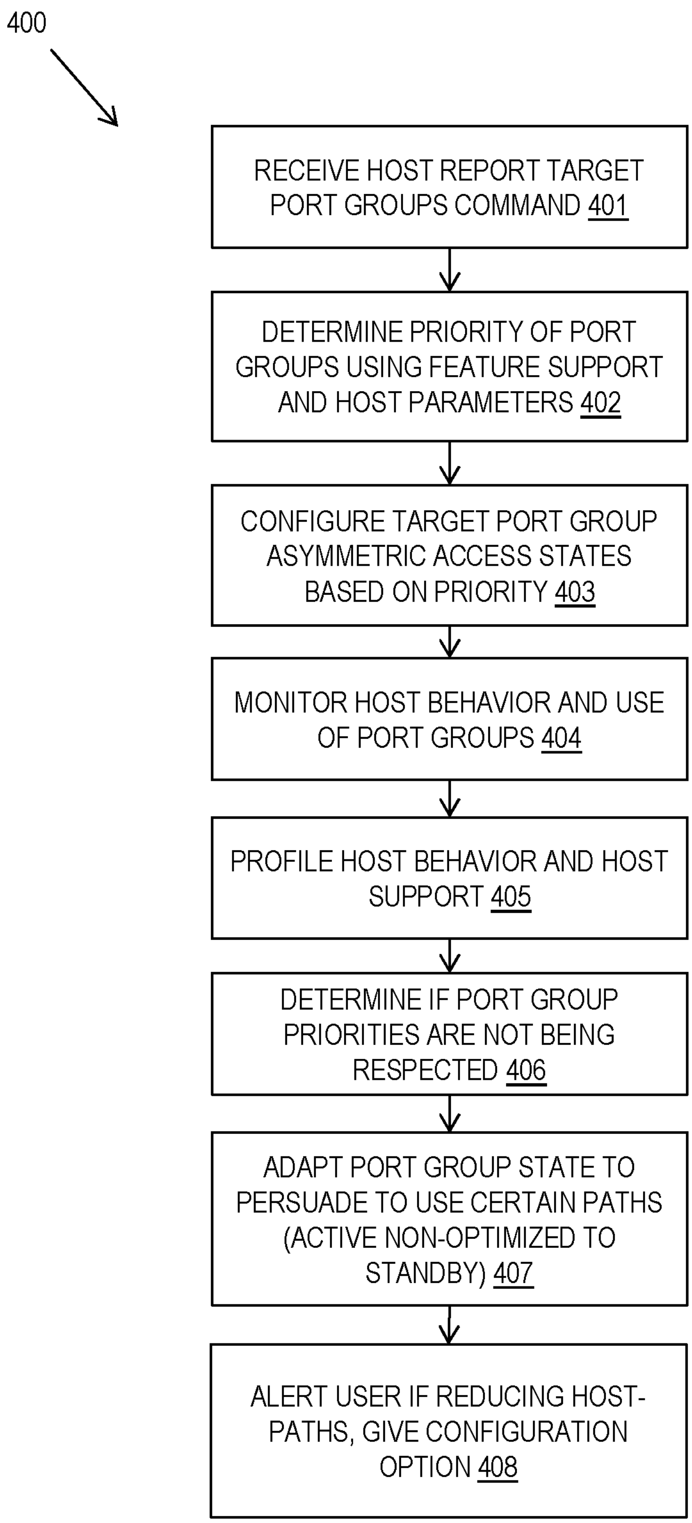
FIG. 4 is a flow diagram of an example embodiment of another aspect of the method in accordance with embodiments of the present disclosure.

Referring to FIG. 4, a flow diagram 400 shows an example embodiment of a further aspect of the described method of adjusting configured states for paths to promote use of storage features.

The method may receive 401 a host report target port groups command and may determine 402 the priority of port groups using feature support and host parameters as described above to configure 403 target port group asymmetric access states based on priority.

The method may monitor 404 host behavior and the use of port groups for host operations. The method may profile 405 the host behavior and host support. The method may then determine 406 if port group priorities are not being respected based on the profiling. The method may adapt 407 port group states to persuade the host to use certain paths. For example, this may transition certain paths' states from Active/Non-Optimized to Standby. This may force hosts away from using a non-feature capable path. In such situations, the method may alert 408 the user if reducing host paths to allow a configuration override option to the user.

In a storage system implemented through multiple storage controllers in a high availability configuration, it is possible to have many technologies implementing the underlying volumes. As examples, some may be implemented using deduplication, some may be implemented using flash-core drives, some may be implemented using conventional flash drives or nearline storage.

In certain circumstances, advantageous storage features are not leveraged by a host. For example, host may be performing IOs against paths which could otherwise be optimized by features such as zero detect. Zero detect is where storage systems that offer thin provisioning have the added ability to detect areas of a volume that have been zeroed out so they can reclaim that space and use it elsewhere. In the case of zero detect, failure to implement zero detect can result in unnecessary storage being leveraged for zeroed data, or a performance impact.

Zero detect is one use case of a storage feature that may be relevant to a host. However, there are numerous other features which may be relevant to a host. For example, one cluster may be better at handling XCOPY or offloaded data transfer (ODX). In another example, the host IO may be required to run through a specific system such as a threat detection system.

The method may detect cases where features are failing to be leveraged due to non-preferred path selection. This can either be done through counting non-optimized path accesses, opportunistically detecting based on the host operating system, or through detecting based on the volume properties. For example, a volume filled with mostly zeros is far more interesting to optimize for compared to a volume filled with random data when leveraging zero detect.

In these circumstances, the described method maintains multiple preferred paths, but modifies the non-preferred path states such that these paths are considered as being on standby. If this is considered too great a risk for multipath failover, the method may alternatively reduce the number of non-preferred paths. The host will still be aware of these paths in the event of a failure; however, the method is able to mitigate the impact of non-preferred accesses. Whatever the pattern, if reducing host-paths, the method may alert the user to the fact that this action is being performed to give a configuration option to choose to not do this.

It is notable also that by optimizing paths based on feature enablement, better use may be made in cases where there are limited resources. For example, if there is a set of ports capable of performing XCOPY, those limited resources can be prioritized for hosts actually leveraging that feature.

The method may apply to a single cluster as well as to multi-system high availability configurations. For example, this may be used as a mitigation for non-preferred flash drives. In another example, there may be certain features implemented in Fibre Channel cards or through Field Programmable Gate Arrays, in which case it may be desirable to select ALUA paths to optimize IOs to paths which are most applicable to them.

The method may also extend beyond modifying ALUA paths from Active/Non-Optimized to Standby in the event that feature-misses are determined. This can also be used to determine which paths should be considered Active/Optimized or to change the direction of an active-passive partnership. For example, if there is a volume which is implemented on thin-provisioned state on one cluster which is mostly empty, whilst the partner high availability-copy is implemented on a fully allocated storage, it may be more optimal to leverage the zero-detection that is intrinsic to thinly provisioned storage. Under such circumstances, the method may adjust the direction of the high availability relationship (if it is active-passive relationship) or set these paths as Active/Optimized (if it is an active-active relationship).

The described method and system have the advantages of better use of storage features through optimized ALUA states, resulting in more optimal performance and potentially better use of storage.

Figure 5:
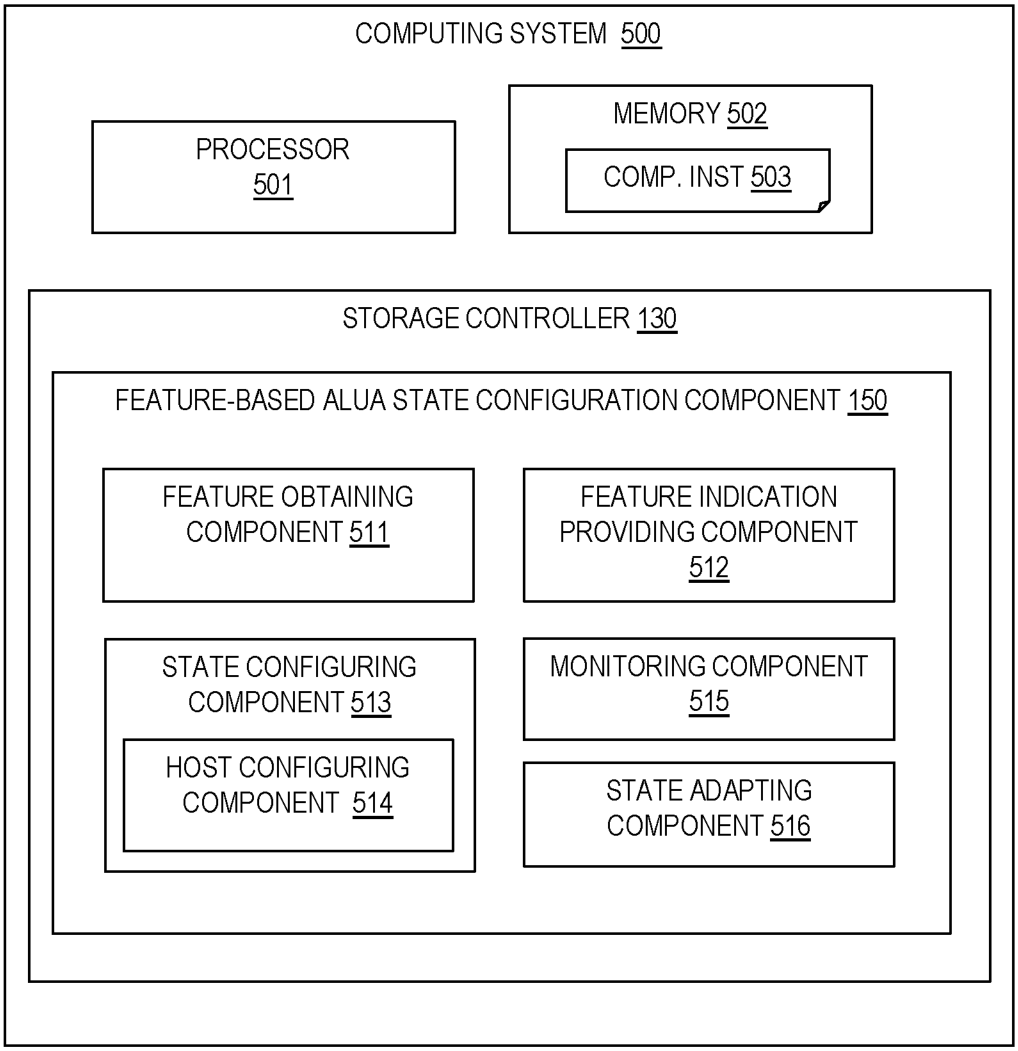
FIG. 5 is a block diagram of an example embodiment of a system in accordance with embodiments of the present disclosure.

Referring to FIG. 5, a block diagram shows an example embodiment of a computer system 500 in which the described method and system may be implemented by running a storage controller 130 including the feature-based state configuration component 150. The computer system may include at least one processor 501, a hardware module, or a circuit for executing the functions of the described components which may be software units executing on the at least one processor. Multiple processors running parallel processing threads may be provided enabling parallel processing of some or all of the functions of the components. Memory 502 may be configured to provide computer instructions 503 to the at least one processor 501 to carry out the functionality of the components.

The feature-based ALUA state configuration component 150 may include a feature obtaining component 511 for obtaining storage feature information from internal knowledge of the storage system of a storage controller. The feature-based ALUA state configuration component 150 may include a feature indication providing component 512 for providing storage feature indications for paths between a host and a volume, where the storage features are provided by the storage system end of the path.

The feature-based ALUA state configuration component 150 include a state configuring component 513 for configuring ALUA states for available paths between a host and a volume based at least partially on the storage feature indications to direct host operations to one or more paths based on available storage features at the storage system to prioritize paths with selected storage features. The state configuring component may include a host configuring component 514 for configuring ALUA states for paths for a given host based on parameters of the host and storage feature of the path required for the host parameters.

The feature-based ALUA state configuration component 150 may include a monitoring component 515 for monitoring use of paths from a host to a volume including use of defined features detecting cases where features are failing to be leveraged due to non-preferred path selection.

The feature-based ALUA state configuration component 150 may include including a state adapting component 516 for adapting a ALUA state to encourage or discourage use of a path by a host in the event that current host accesses result in non-optimal use of a feature.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 6:
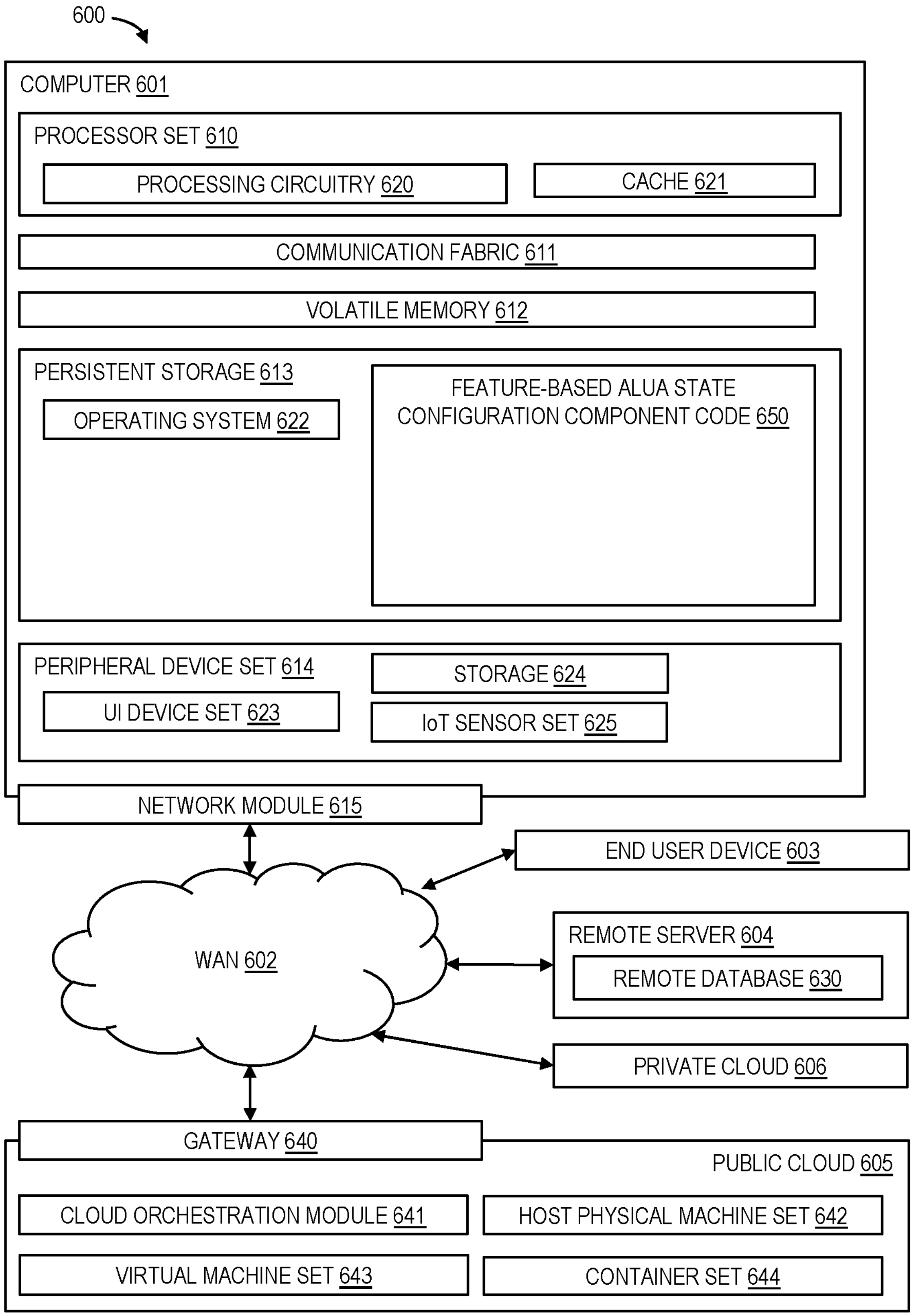
FIG. 6 is a block diagram of an example embodiment of a computing environment for the execution of at least some of the computer code involved in performing embodiments of the present disclosure.

Referring to FIG. 6, computing environment 600 contains an example of an environment for the execution of at least some of the computer code involved in performing the inventive methods, such as feature-based ALUA state configuration component code 650. In addition to block 650, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 650, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip."

In some computing environments, processor set 610 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 600, at least some of the instructions for performing the inventive methods may be stored in block 650 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 650 typically includes at least some of the computer code involved in performing the inventive methods.

PERIPHERAL DEVICE SET 614 includes the set of peripheral devices of computer 601. Data communication connections between the peripheral devices and the other components of computer 601 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 615 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 602 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments. Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present disclosure.

Embodiments of the present disclosure will now be described in reference to the following clauses.

Clause 1. A computer-implemented method for configuring asymmetric logical unit access (ALUA) states for paths in a multipath storage system, said method comprising:
- providing storage feature indications for paths between a host and a volume, wherein the storage features are provided by the storage system end of the path; and
- configuring ALUA states for available paths between a host and a volume based at least partially on the storage feature indications to direct host operations to one or more paths based on available storage features at the storage system to prioritize paths with selected storage features.

Clause 2. The method of clause 1, wherein configuring ALUA states for available paths includes:
- configuring ALUA states for paths for a given host based on parameters of the host and storage feature of the path required for the host parameters.

Clause 3. The method of clause 1 or clause 2, including:
- adapting a ALUA state to encourage or discourage use of a path by a host in the event that current host accesses result in non-optimal use of a feature.

Clause 4. The method of any one of clauses 1 to 3, wherein the storage features include software features and/or hardware features of one or more of the group of: volumes, storage controllers, nodes, and physical storage.

Clause 5. The method of any one of the preceding clauses, including:
- obtaining storage feature information from internal knowledge of the storage system of a storage controller.

Clause 6. The method of any one of the preceding clauses, wherein configuring the ALUA states for paths includes:
- setting priorities of available paths between a host and a volume based on defined feature capabilities of the paths, with higher priority for paths with the feature capability and lower priority for paths without the feature capability.

Clause 7. The method of clause 6, wherein configuring the ALUA states for paths includes:
- setting initial priority for paths based on performance metrics; and
- adjusting the initial priority based feature indication requirements.

Clause 8. The method of any one of the preceding clauses, wherein configuring the ALUA states for paths includes:
- providing heterogenous feature support for dissimilar systems where a first storage feature is prioritized for a first host behavior and a second storage feature is prioritized for a second host behavior.

Clause 9. The method of any one of the preceding clauses, including configuring the ALUA states for paths includes:

prioritizing paths with newly enabled storage features.

Clause 10. The method of any one of the preceding clauses, including monitoring use of paths from a host to a volume including use of defined features.

Clause 11. The method of clause 10, including:

detecting cases where features are failing to be leveraged due to non-preferred path selection; and adapting a ALUA state to encourage use of the preferred path by a host.

Clause 12. The method of any one of the preceding clauses, including:

defining different storage controllers for a volume as running on different software levels having different storage features; and configuring the ALUA states to prioritize certain sets of host commands to the storage software level that supports required features of the host commands.

Clause 13. A system for configuring asymmetric logical unit access (ALUA) states for paths in a multipath storage system, comprising:

a processor and a memory configured to provide computer program instructions to the processor to execute the function of the components:

a feature indication providing component for providing storage feature indications for paths between a host and a volume, wherein the storage features are provided by the storage system end of the path; and a state configuring component for configuring ALUA states for available paths between a host and a volume based at least partially on the storage feature indications to direct host operations to one or more paths based on available storage features at the storage system to prioritize paths with selected storage features.

Clause 14. The system of clause 13, wherein the state configuring component includes a host configuring component for configuring ALUA states for paths for a given host based on parameters of the host and storage feature of the path required for the host parameters.

Clause 15. The system of clause 13 or 14, including a state adapting component for adapting a ALUA state to encourage or discourage use of a path by a host in the event that current host accesses result in non-optimal use of a feature.

Clause 16. The system of any one of clauses 13 to 15, including a feature obtaining component for obtaining storage feature information from internal knowledge of the storage system of a storage controller.

Clause 17. The system of any one of clauses 13 to 16, including a monitoring component for monitoring use of paths from a host to a volume including use of defined features detecting cases where features are failing to be leveraged due to non-preferred path selection.

Clause 18. The system of any one of clauses 13 to 17, configured to be applied in a single storage cluster to promote use of selected features and/or mitigate use of other selected features of the single storage cluster.

Clause 19. The system of any one of clauses 13 to 17, configured to be applied in a multi-system high availability storage system to promote use of selected features and/or mitigate use of other selected features of the multi-system storage system.

Clause 20. A computer program stored on a computer readable medium and loadable into the internal memory of a digital computer, comprising software code portions, when said program is run on a computer, for performing the method steps of any of the clauses 1 to 12.

What is claimed is:

1. A computer-implemented method for configuring asymmetric logical unit access (ALUA) states for paths in a multipath storage system, said method comprising:

providing storage feature indications for paths between a host and a volume, wherein the storage feature indications refer to storage features provided by the storage system at the end of the path;

configuring ALUA states for available paths between a host and a volume based at least partially on the storage feature indications to direct host operations to one or more paths based on available storage features at the storage system to prioritize paths with selected storage features;

monitoring use of the available paths between the host and the volume; and in response to detecting non-optimal use of the available paths based on accesses of paths without one or more of the selected storage features, adapting an ALUA state to encourage or discourage use of a path.

2. The method of claim 1, wherein configuring ALUA states for available paths comprises:

configuring ALUA states for paths for a given host based on parameters of the host and storage feature of the path required for the host parameters.

3. The method of claim 1, wherein adapting the ALUA state comprises changing the ALUA state of a non-preferred path from Active/Non-Optimized to Standby.

4. The method of claim 1, wherein the storage features include software features and hardware features of one or more selected from the group consisting of volumes, storage controllers, nodes, and physical storage.

5. The method of claim 1, further comprising:

obtaining storage feature information from internal knowledge of the storage system of a storage controller.

6. The method of claim 1, wherein configuring the ALUA states for paths comprises:

setting priorities of available paths between a host and a volume based on defined feature capabilities of the paths, with higher priority for paths with the feature capability and lower priority for paths without the feature capability.

7. The method of claim 6, wherein configuring the ALUA states for paths comprises:

setting initial priority for paths based on I/O performance metrics of the paths; and adjusting the initial priority based feature indication requirements.

8. The method of claim 1, wherein configuring the ALUA states for paths comprises:

providing heterogenous feature support for dissimilar systems where a first storage feature is prioritized for a first host behavior and a second storage feature is prioritized for a second host behavior.

9. The method of claim 1, wherein configuring the ALUA states for paths comprises:

prioritizing paths with newly enabled storage features.

10. The method of claim 1, wherein configuring ALUA states for available paths between a host and a volume is further based on I/O performance of the paths.

11. The method of claim 1, further comprising:

defining different storage controllers for a volume as running on different software levels having different storage features, wherein configuring the ALUA states comprises prioritizing certain sets of host commands to the storage software level that supports required features of the host commands.

12. A system for configuring asymmetric logical unit access (ALUA) states for paths in a multipath storage system, comprising:

one or more processors and one or more memories configured to provide computer program instructions to the one or more processors to execute the function of components, the components comprising:

a feature indication providing component for providing storage feature indications for paths between a host and a volume, wherein the storage feature indications refer to storage features provided by the storage system at the end of the path;

a state configuring component for configuring ALUA states for available paths between a host and a volume based at least partially on the storage feature indications to direct host operations to one or more paths based on available storage features at the storage system to prioritize paths with selected storage features;

a monitoring component for monitoring use of the available paths between the host and the volume; and a state adapting component for, in response to detecting non-optimal use of the available paths based on accesses of paths without one or more of the selected storage features, adapting an ALUA state to encourage or discourage use of a path.

13. The system of claim 12, wherein the state configuring component includes a host configuring component for configuring ALUA states for paths for a given host based on parameters of the host and storage feature of the path required for the host parameters.

14. The system of claim 12, wherein adapting the ALUA state comprises changing the ALUA state of a non-preferred path from Active/Non-Optimized to Standby.

15. The system of claim 12, wherein the components further comprise a feature obtaining component for obtaining storage feature information from internal knowledge of the storage system of a storage controller.

16. The system of claim 12, wherein the components are configured to be applied in a single storage cluster to promote use of selected features and mitigate use of other selected features of the single storage cluster.

17. The system of claim 12, wherein the components are configured to be applied in a multi-system high availability storage system to promote use of selected features and mitigate use of other selected features of the multi-system storage system.

18. A computer program product for configuring asymmetric logical unit access (ALUA) states for paths in a multipath storage system, the computer program product comprising a computer readable storage medium having program instructions embodied therewith, the program instructions executable by a processor to cause the processor to:

provide storage feature indications for paths between a host and a volume, wherein the storage feature indications refer to storage features provided by the storage system at the end of the path;

configure ALUA states for available paths between a host and a volume based at least partially on the storage feature indications to direct host operations to one or more paths based on available storage features at the storage system to prioritize paths with selected storage features;

monitoring use of the available paths between the host and the volume; and in response to detecting non-optimal use of the available paths based on accesses of paths without one or more of the selected storage features, adapting an ALUA state to encourage or discourage use of a path.

* * * * *